United States Patent

[11] 3,588,651

| [72] | Inventor | Arthur K. Littwin |
| --- | --- | --- |
| | | 6555 N. Le Mai, Lincolnwood, Ill. 60645 |
| [21] | Appl. No. | 808,282 |
| [22] | Filed | Mar. 18, 1969 |
| [45] | Patented | June 28, 1971 |

[54] SOLID STATE ELECTRICAL CONTROL FOR A REVERSIBLY MOVABLE MEMBER
8 Claims, 6 Drawing Figs.

| [52] | U.S. Cl. | 318/266, 318/282, 318/286, 318/466 |
| --- | --- | --- |
| [51] | Int. Cl. | H02p 1/22 |
| [50] | Field of Search | 318/282, 286, 266, 466 |

[56] References Cited
UNITED STATES PATENTS
3,045,165  7/1962  Littwin .......... 318/286

Primary Examiner—Oris L. Rader
Assistant Examiner—K. L. Crosson
Attorney—Paul H. Gallagher ABSTRACT: A solid-state control for an operating instrumentality having a member movable through a succession of operating ranges, such as reversing in each successive range, utilizing the movable member for controlling-buildup of inductance for effecting the change from one range to the next of the movable member, the buildup of inductance imposing a bias on the solid-state components, and thereby controlling the operation of the movable member; the apparatus also includes means for adjustably controlling the extent of buildup for unit movement of the movable member for thereby controlling the extent of each range.

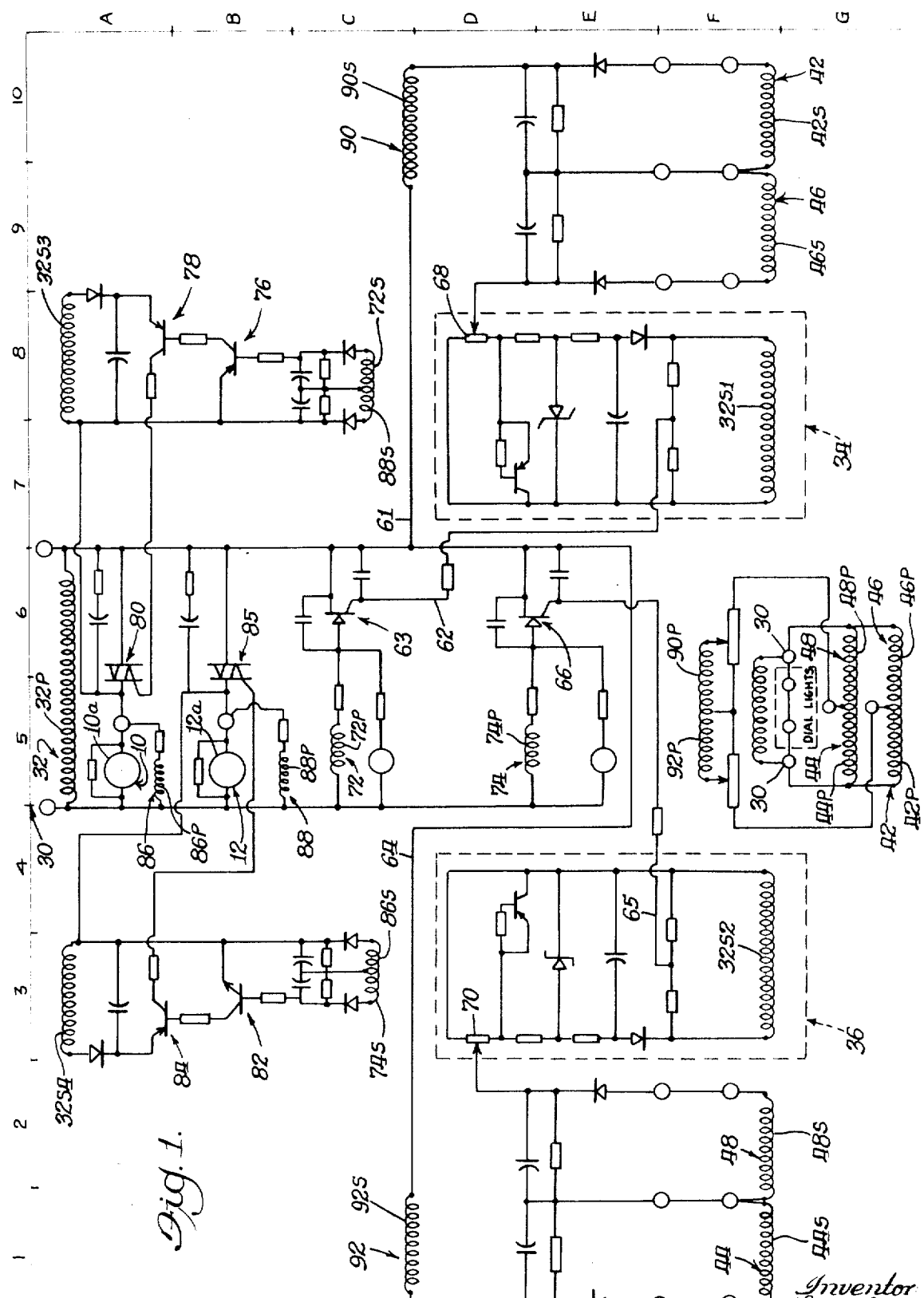

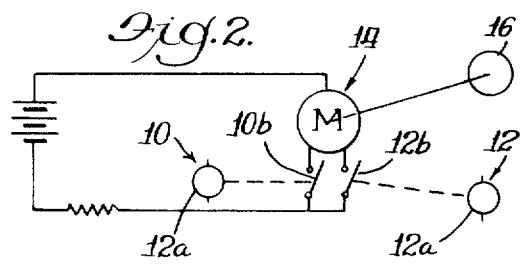
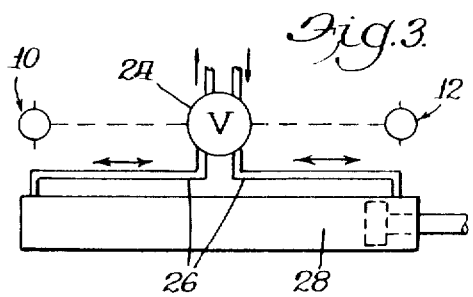
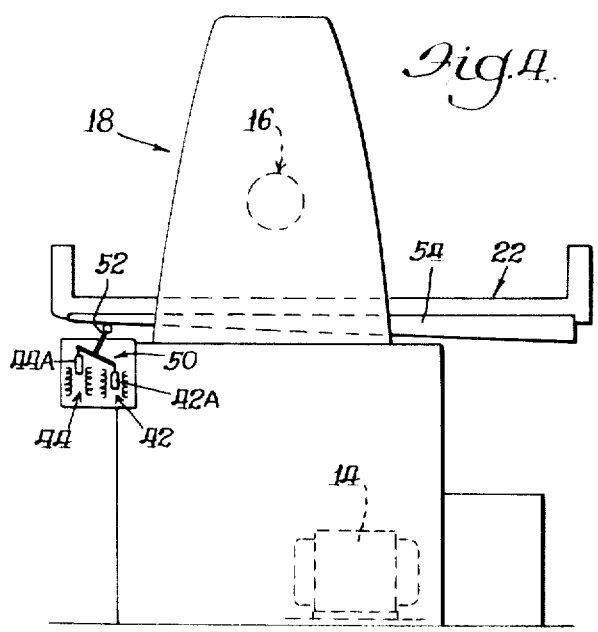
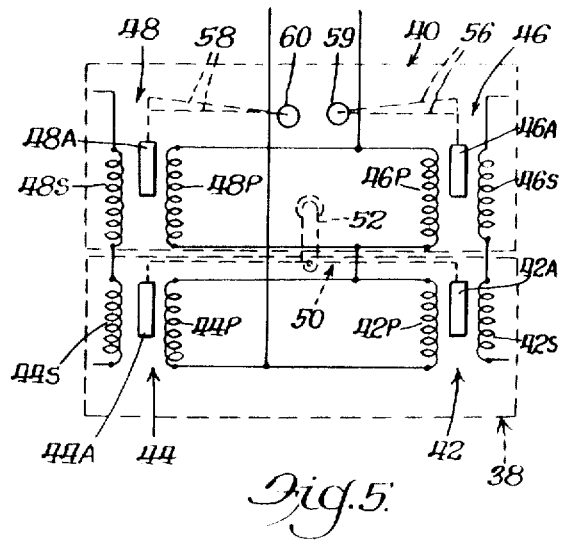
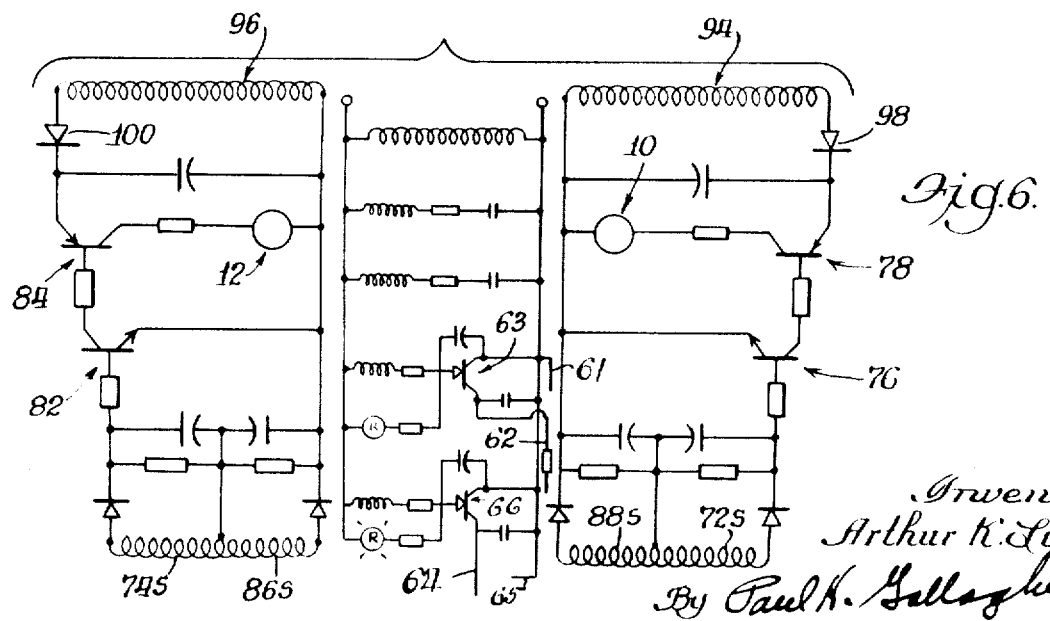
Inventor
Arthur K. Littwin
By Paul K. Gallagher Atty

SOLID STATE ELECTRICAL CONTROL FOR A REVERSIBLY MOVABLE MEMBER

OBJECTS OF THE INVENTION

A broad object of the invention is to provide solid-state control for a machine having a movable member, utilizing the movable member for controlling buildup of inductance imposed on the solid state components of the control, for thereby controlling the movement of the movable member itself.

The control apparatus utilizes transistors in effecting the desired control functions which in the present instance involve the movement of a movable member as in a machine tool through a succession of movements, which may be successively in reverse directions. Specifically the functions are accomplished by imposing buildup of inductance on the transistors to turn them on or shut them off respectively, as desired, for accomplishing the desired movements of the movable member.

Another broad object of the invention is to provide a novel arrangement of solid-state electrical control which involves an interlock of electrical and mechanical features.

Another and more specific object is to provide a control arrangement and circuit of the foregoing general character, involving solid-state control components, in a novel arrangement whereby longer life of the various units and components used in the apparatus is achieved, and which requires less maintenance; also in which there is less possibility of malfunction, together with the further advantages that quicker response and operation is achieved, since no warmup time is required, and additionally providing an arrangement which is much more compact than has been heretofore produced.

An additional and still more specific object is to provide a solid-state control apparatus of the foregoing character which is completely interchangeable with a previously known control arrangement which did not involve solid-state control components, and further in which the initiating or specifically actuated elements are substantially identical with other types of control heretofore utilized whereby to enable substitution of a control of the present invention for a control of the character heretofore known that is already installed.

DESCRIPTION OF A SPECIFIC EMBODIMENT OF THE INVENTION

In the drawings:

FIG. 1 is a diagram of the circuit utilized in the control apparatus of the invention;

FIG. 2 is a circuit diagram showing the application of two output units of the apparatus as controlled by the circuit of FIG. 1;

FIG. 3 is a view similar to FIG. 2 but as applied to a mechanical or hydraulic arrangement;

FIG. 4 is a view of a machine representing one form of device to which the apparatus may be applied;

FIG. 5 is a diagram showing certain control components lifted from the circuit of FIG. 1 and arranged mechanically and spatially for the purpose of illustrating the control movements of the device to be controlled; and FIG. 6 is a diagram of a portion of a circuit, modified relative to that of FIG. 1.

Referring now in detail to the drawings, the circuit of FIG. 1 represents substantially the entire electrical apparatus of the invention. The diagram is provided with border coordinates for facilitating location of the various components and elements thereof. FIGS. 2—5 represent specific applications of the apparatus to an instrumentality to be controlled. For example, FIG. 2 includes a pair of output components or units 10, 12 which may be electrical relays including coils 10a, 12a respectively, and corresponding contacts 10b and 12b. These relays control the operation of a reversible motor 14 for driving a work device 16, here represented diagrammatically and which may be a grinding wheel (FIG. 4) or other instrumentality. The relays 10, 12 are represented in the circuit of FIG. 1, respectively at (A-5, B-5) which constitute the output instrumentalities of that circuit and controlled thereby.

The motor 14 and grinding wheel 16 may be embodied in a grinder 18 represented in FIG. 4 where the motor operates a reciprocating table 22. The grinder 18 may be as represented in my prior U.S. Pat. No. 3,045,165, dated July 17, 1962, to which reference may be had for a description of the machine and its general type of operation. This machine will be referred to again hereinbelow.

FIG. 3 represents the application of the electrical apparatus of the invention to a hydraulic motor, in which the components 10, 12 may be solenoids and control, in respective phases, a reversing valve 24 for controlling the reversing flow of fluid through lines 26 for reversibly operating a hydraulic device 28. The hydraulic device 28 and the reversing valve 24 are of known types, and the components 10, 12 are energized alternately for driving the hydraulic device in corresponding directions.

Reference is made now to the detail description of the circuit of FIG. 1, following which is a description of the specific functions of the circuit in controlling the output components or units 10, 12. The circuit of FIG. 1 includes a line 30 (A-5, 6) for connection with for example 115 v. AC source. Across the line 30 is a transformer 32 which includes a primary 32P.

In the following description the various transformers are indicated generally by simple reference numerals, and the primaries and secondaries thereof by the same reference numerals with the postscripts P and S respectively and this applies whether or not they are individually referred to.

The circuit of FIG. 1 includes basically two portions, or halves, identical or similar and each operative for controlling operation of the finally controlled member (e.g., motor) in a corresponding sense, such as a direction of movement; in the present disclosure the apparatus is applied to a reversibly operating device such as a reciprocating able in a grinding machine as referred to above. Accordingly, at least in part, a description of one portion of the circuit will suffice for both, with explanation of the relation between the two in their respective phases of operation of the controlled device.

The circuit includes subcircuits or bias supply circuits 34 (G-7), 36 (G-3), respectively associated with the output components 10 (A-5), 12 (B-5), and including secondaries 32S1 (G-8) and 32S2 (G-3). Also incorporated in the circuit are a traverse control 38 and a remote control 40, the elements thereof being grouped in FIG. 5 according to their spatial and functional interrelation while distributed in the circuit of FIG. 1 according to diagrammatic convenience. In the traverse control 38 are a pair of transformers 42, 44 including primaries 42P (G-5), 44P (G-6) and secondaries 42S (F-10), 44S (F-1). Also associated with the transformers are corresponding cores 42A, 44A (FIG. 5). The remote control 40 includes transformers 46, 48, including corresponding primaries 46P (G-6), 48P (G-6), secondaries 46S, (F-9), 48S (F-2) and cores 46A, 48A (FIG. 5).

In one form of the invention, (as in a grinder—FIGS. 4 and 5) the cores 42A, 44A of the traverse control are mounted on a common beam 50 having an arm 52 engaging the inclined surface of a taper bar 54 mounted on the reciprocable table 22 of the grinder. As the table reciprocates, the arm 52 follows the inclined surface and respectively moves the cores oppositely into and out of the coils of the transformers 42, 44.

The armatures 46A, 48A (FIG. 5) of the remote control 40 are mounted on individual arms 56, 58 individually and manually controlled and set by knobs 59, 60 for respectively positioning the cores in the corresponding transformers. The positioning of these cores controls the triggering or the operation of successive stages in the total operation of the device. Upon reciprocating movements of the table 22 of the grinder (FIG. 4) the cores 42A, 44A move into or out of the corresponding coils and produce corresponding inductance in the coils, which is counteracted by that of the coils of the transformers 46, 48, for consequent control of the output components 10, 12 as described below.

The secondary 32S1 (F-8) is operative for applying control voltage on the gate of an SCR 63 (C-6) through conductors 61 and 62 while the secondary 32S2 (F-3) is operative for supplying control voltage on the gate of an SCR 66 (E-6), through conductors 64 and 65.

Associated with the SCR 63 is a potentiometer 68 (D-8), manually adjustable, and similarly a potentiometer 70 (D-3) is associated with the SCR 66, the potentiometer 70 also being manually adjustable.

When the SCR 63 (C-6) is turned on it energizes the primary 72P (C-5) of a transformer 72, while when the SCR 66 is turned on it energizes the primary 74P (D-5) of a transformer 74. Energization of the primary 72P correspondingly energizes a secondary 72S (C-8), which turns on a transistor 76 (B-8), and the latter turns on a transistor 78 (A-8). When the transistor 78 is turned on, circuit is completed through the secondary 32S3 (A-8), which is in series with a triac 80 (A-6). In a correlative portion of the circuit, the primary 74P (D-5) energizes a secondary 74S (C-3) and this in turn energizes a transistor 82 (B-3) and thereby completes circuit through another triac 85 (B-6).

Energization of the triac 80 (A-6), completes a circuit between the primary 32P (A-5) and another primary 86P (B-5) of a transformer 86. Similarly energization of the triac 85 (B-6) completes a circuit between the primary 32P and another coil 88P (B-5) forming the primary of a transformer 88. The primary 86P energizes a secondary 86S (C-3) while the primary 88P energizes a secondary 88S (C-8).

The triac 80 (A-6) when energized completes a circuit through the output component 10 (A-5) (relay etc.) while energization of the triac 85 (B-6) completes a circuit through the corresponding output component 12 (B-5).

Reference is now made to a practical installation and operation of the apparatus of the invention as in a grinder such as shown in FIG. 4. For convenience, a starting point is assumed as shown in that FIG., namely, with the table to the right; in such position the core 42A (FIGS. 4, 5) is in a position projected into the corresponding coils 42P, 42S; the bias supplied by the subcircuit 34 (G-7) through the secondary 32S1 (F-8), maintains the motor 14 operating in a first direction as to the left through a circuit and energization as follows: the SCR 63 (C-6), is conducting, primary 72P (C-5) is energized, which in turn energizes 72S (C-8), turning on transistor 76 (B-8) and in turn turning on transistor 78 (A-8). The transistor 78 completes circuit through secondary 32S3 (A-8) and the triac 80 (A-6) in series therewith. Energization of the triac completes a circuit through the main primary 32P, (A-5) and primary 86P (B-5). The triac 80 upon energization thereof also completes a circuit through the component or unit 10 (A-5) which is in an operating condition assumed at the beginning of the description of this phase of the operation. Energization of the primary 86P (B-5) also energizes the secondary 86S (C-3) which applies negative voltage to the transistor 82 (B-3) and holds the latter off.

However, upon continued movement of the table and consequent movement of the core 42A (FIGS. 4 and 5) into the coils 42P, 42S, the inductance is overcome by the condition established by the setting of the core 46A, allowing the transistor 76 (B-8) to shut off. Thereupon the inductance in the transformer 44 turns on the transistor 66 (E-6) and energizes the transformer primary 74P. It also energizes successively the transistors 82, 84 and accordingly energizes the triac 85 and consequently the output component 12, as well as the primary 88P (B-5). Consequently, the motor reverses and drives the table in the opposite direction, and moves the core 44A further into the coils 44P, 44S, and the inductance thereof is counteracted by the condition established by the setting of the core 48A. Upon the core 44A being moved into its coils, and progressively further thereinto, a similar but opposite series of steps are repeated as just previously described in connection with the first half of the circuit, as will be appreciated. In this case similarly the triac 85 completes the circuit through the main primary 32P (A-5) and the primary 88P (B-5), and thus the operation is the same as in the other portion of the circuit. When the component 12 (B-5) becomes energized, it effects driving the motor 14 in the opposite direction, and in the case of the grinder of FIG. 4 correspondingly driving the table 22 in the opposite direction, which in the example assumed would be to the left as viewed in FIG. 4. The reverse operations of the table are accomplished in a manner generally similar to that of my prior patent identified above.

The adjustable potentiometers 68 (D-8), 70 (D-3) provide means for assuring that either one portion or the other of the circuit is energized at all times, i.e., there should be no hiatus between the periods of effectiveness or operation of the two different components of the circuit. The potentiometers 68, 70 are to be appropriately adjusted so as to "overlap," to prevent any such hiatus, each retaining its own transistor conducting until it is over-influenced by the other. Additionally the arrangement provides an effective interlock preventing either component from becoming energized while the other is determinedly energized; this is effected by the arrangement wherein while the component 10 (A-5) is energized, the coil 86P (A-5) also is energized and acting through the secondary 86S (C-3) applies negative bias to and holds off the transistor 82 and hence the component 12 (B-5); in a similar manner, while the component 12 is energized, the coil 88P (B-5) also is energized and acting through the secondary 88S (C-8) applies negative voltage to and holds off the transistor 76 and hence the component 10.

As indicated above, associated directly with the transformers 42, 44 (FIG. 5) are the transformers 46, 48, and the cores 46A, 48A thereof which are individually adjustable into or out of the corresponding coils. For example if the core 46A is positioned relatively a greater extent into its coils, the sooner will it counteract the buildup of inductance by the core 42A by its movement into its coils; in a similar sense depending upon the extent of projection of the core 48A into its coils 48P, 48S, the sooner will be the effective and turnoff bias produced thereby. The cores 46A, 48A can be individually and manually set by manipulating the knobs 59, 60 for controlling the corresponding positions of those cores, and predetermining the effectiveness of the cores 42A, 44A in their movements through the respective coils. This in turn controls the range, both in extent and bodily position, of the device to be controlled, such as the reciprocating table 22 of FIG. 4.

The movement and the operational control of the cores 42A, 44A as well as the manually settable cores 46A, 48A is similar to that disclosed in my prior patent referred to above, and attention is directed to that patent for additional details in connection with the total operation of the machine. An advantage of the present invention is that the physical arrangement and construction of coils as functionally represented in FIG. 5, is substantially identical with that of that patent, and accordingly it is possible and convenient to substitute the solid-state circuit arrangement and construction of the present invention for the electrical construction heretofore incorporated in a mechanical contrivance, such as a grinder, of the kind disclosed in that patent. In other words the coils 42, 44, 46, 48 of FIG. 5 can be physically and mechanically incorporated in a control arrangement constituted substantially by the circuit disclosed in FIG. 1 of the present disclosure.

As a refinement of the control, it is preferred that transformers 90 (C-10), 92 (C-1) be provided, the primaries being at (F-6) and (F-5). The secondaries 90 (C-10), 92 (C-1) are connected in series with the secondaries of the traverse and remote control coils, as follows, 90S (C-10) with the secondaries 42S, 46S and 92S with the secondaries 44S, 48S. The transformers 90, 92 are arranged to provide opposition to the otherwise driving control provided by the circuit, to the final ultimate output component 10, 12, so as to provide more immediate and minute control of those components. This arrangement compensates for loss of voltage resulting from the change of direction of movement of the cores 42A, 44A, and promotes linearity of voltage in the system.

The circuit above disclosed and described in detail, is a complete solidtstate circuit with no moving parts, i.e., in the circuit as represented in FIG. 1; the cores shown in FIG. 5 are mounted as mechanical moving members on the mechanical contrivance to be controlled; the relays 10, 12, in themselves of electrical nature, are connected with outside instrumentalities, but may include mechanically movable members such as cores etc.

The electrical apparatus disclosed in FIG. 1 is totally interchangeable with previously known types of control apparatus such as disclosed in my prior patent referred to above, in that the coils of the transformers 42, 44, 46, 48 utilized in the present invention may be identical with those represented in my above mentioned patent, and the remainder of the circuit merely connected with the transformers by simple electrical connection.

FIG. 6 shows a portion of a circuit modified relative to that of FIG. 1. It is sometimes desired that DC be utilized directly in controlling the output components (10, A-5: 12, B-5) instead of the AC line as in FIG. 1 acting through the triacs. Such an arrangement is provided in the circuit of FIG. 6 where the transformer secondaries 94, 96 replace the transformers 32S3 (A-8), 32S4 (A-3), and associated with these secondaries are rectifiers 98, 100 in series with the output components 10, 12, the output components being driven by the DC thus produced through the rectifiers by the transistors 78, 84. The other components and elements directly associated with the output components are the same as in FIG. 1 and so identified.

I claim:

1. Apparatus for controlling the movements of a reciprocable member including an electrical circuit having an AC source, a main transformer connected with said source, a pair of output components operative for controlling means for driving the reciprocable member alternately in opposite directions, a triac associated with each output component, transistor means associated with each triac and operative upon its own energization for energizing the triac, a winding for imposing positive bias on the transistor means, a remote control winding in series with the first winding for imposing negative bias on the transistor means, a third transformer winding forming a secondary of the main transformer for imposing positive bias on the transistor means and energizing it, traverse transformer means, movable cores associated with the traverse transformer means and controlled by the movements of the reciprocable member and operative upon corresponding movements thereof for controlling the traverse transformer means, said traverse transformer means being operative for controlling said remote control windings and thereby controlling the energization of the transistor means, and remote control transformer means in series with the traverse transformer means, and manually settable cores in the remote control windings for counteracting the inductance produced by the latter and correspondingly terminating the effectiveness of the traverse control transformer.

2. Apparatus according to claim 1 wherein a control winding is arranged parallel to each output component and is incorporated in transformer means operative for imposing negative bias on the transistor means associated with the opposite direction of movement of the reciprocable member.

3. Apparatus for controlling the movements of a reciprocable member including an electrically controlled output component for moving the reciprocable member in each direction, a pair of traverse transformers associated one with each of the directions of movement, a pair of remote control transformers respectively associated with the traverse transformers, first movable cores controlled by the reciprocable member and operable in corresponding ones of the traverse transformers, second movable cores operable in corresponding ones of the remote control transformers, manually operable means for adjustably moving the second movable cores, an AC source, a triac operatively associated with each output component, transistor means associated with each triac and when energized operable for energizing the respective triac, the first movable cores being operative for energizing the respective transistor means, the second movable cores being operative for counteracting the first movable cores and controlling the energization of the respective transistor means for thereby controlling the output components in the corresponding direction of movement of the reciprocal member.

4. Apparatus according to claim 3 wherein triac means is interposed between each output component and the respective transistor means arranged for controlling it.

5. Apparatus according to claim 3 wherein each output component is in series with a component of the corresponding transistor means and is energized directly in response to the energization of the corresponding transistor means.

6. Apparatus according to claim 3 and including means operative, when each transistor means is energized, for deenergizing the opposed corresponding transistor means.

7. Apparatus according to claim 6 wherein the means for energizing the transistor means includes windings for providing positive bias on the transistor means for energizing it, and operative simultaneously therewith for imposing negative bias on the opposite transistor means for deenergizing it.

8. Apparatus according to claim 7 wherein the negative bias on the opposite transistor means, in each instance, is prolonged beyond the point at which the positive bias on the first mentioned transistor means is terminated whereby to eliminate all hiatus between the energization of the first transistor means and the energization of the second transistor means.